(12) United States Patent
Al-Imari

(10) Patent No.: US 11,139,927 B2
(45) Date of Patent: Oct. 5, 2021

(54) METHOD AND APPARATUS FOR RE-TRANSMISSION OF SYSTEM INFORMATION MESSAGE IN MOBILE COMMUNICATIONS

(71) Applicant: MediaTek Singapore Pte. Ltd., Singapore (SG)

(72) Inventor: Mohammed S Aleabe Al-Imari, Cambridge (GB)

(73) Assignee: MediaTek Singapore Pte. Ltd., Singapore (SG)

(*) Notice: Subject to any disclaimer, the term of this patent is extended or adjusted under 35 U.S.C. 154(b) by 16 days.

(21) Appl. No.: 16/595,718

(22) Filed: Oct. 8, 2019

(65) Prior Publication Data

US 2020/0112401 A1    Apr. 9, 2020

Related U.S. Application Data

(60) Provisional application No. 62/743,007, filed on Oct. 9, 2018.

(51) Int. Cl.
*H04W 48/12* (2009.01)
*H04L 1/18* (2006.01)
*H04W 28/04* (2009.01)

(52) U.S. Cl.
CPC ........... *H04L 1/1829* (2013.01); *H04W 28/04* (2013.01)

(58) Field of Classification Search
CPC ..... H04W 28/04; H04W 28/08; H04W 28/02; H04W 28/06; H04W 28/10; H04W 28/0273; H04W 28/0289; H04L 1/1829; H04L 1/1832; H04L 1/1848; H04L 1/1864; H04L 1/1867; H04L 1/1809; H04L 1/18

(Continued)

(56) References Cited

U.S. PATENT DOCUMENTS

2015/0223234 A1    8/2015  Seo et al.
2016/0134403 A1*   5/2016  Xiong ............... H04W 72/0446
                                                     370/329

(Continued)

FOREIGN PATENT DOCUMENTS

CN    104901775 A    9/2015
CN    106899381 A    6/2017
TW    201818735 A    5/2018

OTHER PUBLICATIONS

Taiwan Intellectual Property Office, Office Action for Taiwan Patent Application No. 1081365584, dated May 29, 2020.

(Continued)

*Primary Examiner* — Phong La
(74) *Attorney, Agent, or Firm* — Han IP PLLC; Andy M. Han

(57) ABSTRACT

Various solutions for re-transmission of system information (SI) message with respect to user equipment and network apparatus in mobile communications are described. An apparatus may receive a first physical downlink shared channel (PDSCH) from a network node. The apparatus may receiving a second PDSCH from the network node. The apparatus may determine whether a timing gap between the first PDSCH and the second PDSCH is less than a predetermined processing time. The apparatus may ignore the second PDSCH in an event that the timing gap is less than the predetermined processing time.

16 Claims, 4 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 2016/0330011 | A1* | 11/2016 | Lee | H04L 5/006 |
| 2019/0007117 | A1* | 1/2019 | Kim | H04B 7/0695 |
| 2019/0029052 | A1* | 1/2019 | Yang | H04L 1/1861 |
| 2019/0109692 | A1* | 4/2019 | Gao | H04L 1/18 |
| 2019/0223042 | A1* | 7/2019 | Su | H04L 5/0058 |
| 2019/0230685 | A1* | 7/2019 | Park | H04W 72/0453 |
| 2019/0254045 | A1* | 8/2019 | Sadiq | H04W 72/0446 |
| 2019/0289586 | A1* | 9/2019 | Ouchi | H04L 27/2602 |
| 2020/0021408 | A1* | 1/2020 | Shimezawa | H04L 5/0044 |
| 2020/0052830 | A1* | 2/2020 | Liu | H04L 5/14 |
| 2020/0053776 | A1* | 2/2020 | John Wilson | H04W 16/14 |
| 2020/0106566 | A1* | 4/2020 | Yeo | H04W 28/04 |
| 2020/0221428 | A1* | 7/2020 | Moon | H04L 5/00 |
| 2020/0228267 | A1* | 7/2020 | Park | H04B 7/0639 |
| 2020/0260428 | A1* | 8/2020 | Xu | H04B 7/0626 |
| 2020/0275476 | A1* | 8/2020 | Yang | H04W 72/1268 |
| 2020/0322120 | A1* | 10/2020 | Yang | H04L 5/0007 |
| 2020/0389276 | A1* | 12/2020 | Xia | H04L 5/0005 |
| 2020/0396709 | A1* | 12/2020 | Sun | H04W 56/0045 |

OTHER PUBLICATIONS

China National Intellectual Property Administration, International Search Report and Written Opinion for PCT/CN2019/110068, dated Dec. 31, 2019.

* cited by examiner

| $\mu$ | PDSCH decoding time $N_1$ [symbols] | |
|---|---|---|
| | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 |

FIG. 2

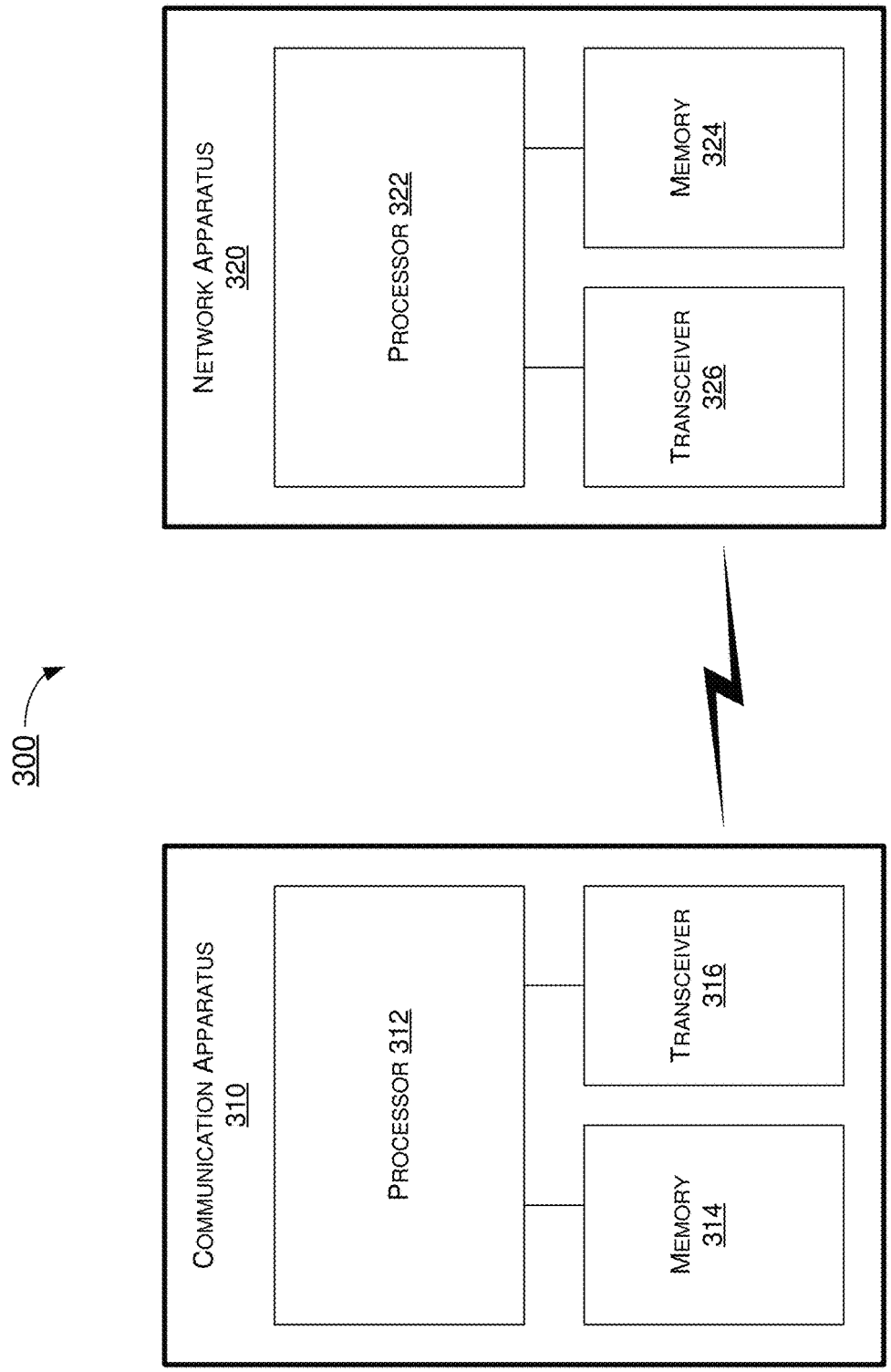

METHOD AND APPARATUS FOR RE-TRANSMISSION OF SYSTEM INFORMATION MESSAGE IN MOBILE COMMUNICATIONS

CROSS REFERENCE TO RELATED PATENT APPLICATION(S)

The present disclosure is part of a non-provisional application claiming the priority benefit of U.S. Patent Application No. 62/743,007, filed on 9 Oct. 2018, the content of which is incorporated by reference in its entirety.

TECHNICAL FIELD

The present disclosure is generally related to mobile communications and, more particularly, to re-transmission of system information (SI) message with respect to user equipment and network apparatus in mobile communications.

BACKGROUND

Unless otherwise indicated herein, approaches described in this section are not prior art to the claims listed below and are not admitted as prior art by inclusion in this section.

In Long-Term Evolution (LTE) or New Radio (NR), hybrid automatic repeat request (HARQ) procedure is introduced to improve transmission reliability. The user equipment (UE) needs to report HARQ-acknowledgement (HARQ-ACK) information for corresponding downlink transmissions in a HARQ-ACK codebook. The HARQ procedure may involve a plurality of HARQ processes (e.g., 8 HARQ processes). Each downlink transmission may associate with one HARQ process identifier (ID). The HARQ process ID is used to identify a unique HARQ process. The same HARQ process ID can be used to identify a re-transmission of data. This can enable the UE to make use of the repeated transmission for soft combining.

In NR, there are restrictions on the reception or transmission of data that are associated with same HARQ process ID. For example, the UE is not expected to receive another physical downlink shared channel (PDSCH) for a given HARQ process until after the end of the expected transmission of HARQ-ACK for that HARQ process. Accordingly, the network node is not expected to perform the re-transmission of the PDSCH before receiving the HARQ-ACK information corresponding to the PDSCH from the UE.

However, NR supports re-transmission for SI message within an SI window. For broadcast SI message transmission, the UE does not transmit any HARQ-ACK in response to PDSCH receptions. The network node will keep transmitting SI messages without HARQ-ACK from the UE. On the other hand, the UE needs a period of time to process the PDCCH/PDSCH. In an event that two transmissions associated with the same SI message are received consecutively, the UE would not have enough time to process two consecutive PDSCH and perform soft combining.

Accordingly, how to guarantee enough timing gap between one PDSCH to another PDSCH for the same SI message transmission becomes an important issue in the newly developed wireless communication network. To avoid decoding failure, it is essential to consider the signal processing latency. Therefore, it is needed to provide proper re-transmission schemes for the SI message.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to re-transmission of SI message with respect to user equipment and network apparatus in mobile communications.

In one aspect, a method may involve an apparatus receiving a first PDSCH from a network node. The method may also involve the apparatus receiving a second PDSCH from the network node. The method may further involve the apparatus determining whether a timing gap between the first PDSCH and the second PDSCH is less than a predetermined processing time. The method may further involve the apparatus ignoring the second PDSCH in an event that the timing gap is less than the predetermined processing time.

In one aspect, an apparatus may comprise a transceiver which, during operation, wirelessly communicates with a network node of a wireless network. The apparatus may also comprise a processor communicatively coupled to the transceiver. The processor, during operation, may perform operations comprising receiving, via the transceiver, a first PDSCH from the network node. The processor may also perform operations comprising receiving, via the transceiver, a second PDSCH from the network node The processor may further perform operations comprising determining whether a timing gap between the first PDSCH and the second PDSCH is less than a predetermined processing time. The processor may further perform operations comprising ignoring the second PDSCH in an event that the timing gap is less than the predetermined processing time.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

FIG. 2 is a diagram depicting an example scenario under schemes in accordance with implementations of the present disclosure.

FIG. 3 is a block diagram of an example communication apparatus and an example network apparatus in accordance with an implementation of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to re-transmission of SI message with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In LTE or NR, HARQ procedure is introduced to improve transmission reliability. The UE needs to report HARQ-ACK information for corresponding downlink transmissions in a HARQ-ACK codebook. The HARQ procedure may involve a plurality of HARQ processes (e.g., 8 HARQ processes). Each downlink transmission may associate with one HARQ process ID. The HARQ process ID is used to identify a unique HARQ process. The same HARQ process ID can be used to identify a re-transmission of data. This can enable the UE to make use of the repeated transmission for soft combining.

Figure 1:
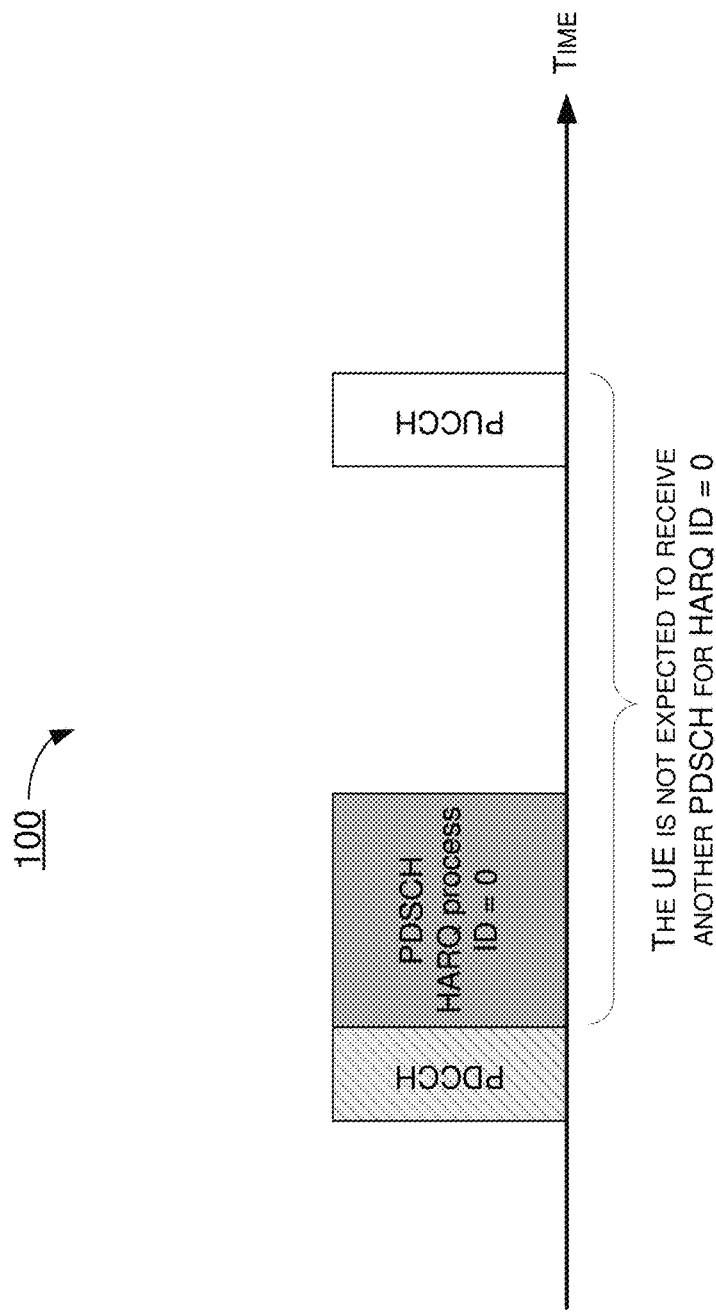
FIG. 1 is a diagram depicting an example scenario under schemes in accordance with implementations of the present disclosure.

In NR, there are restrictions on the reception or transmission of data that are associated with same HARQ process ID. FIG. 1 illustrates an example scenario 100 under schemes in accordance with implementations of the present disclosure. Scenario 100 involves a UE and a network node, which may be a part of a wireless communication network (e.g., an LTE network, an LTE-Advanced network, an LTE-Advanced Pro network, a 5G network, an NR network, an IoT network or an NB-IoT network). The UE may be configured to receive a physical downlink control channel (PDCCH) and a scheduled PDSCH. The PDSCH may associate with the HARQ process ID=0. Then, the UE may be configured to transmit a physical uplink control channel (PUCCH) carrying the HARQ-ACK information corresponding to the PDSCH to the network node. Under such configuration, the UE is not expected to receive another PDSCH for a given HARQ process (e.g., HARQ process ID=0) until after the end of the expected transmission of HARQ-ACK for that HARQ process (e.g., PUCCH). Accordingly, the network node is not expected to perform the re-transmission of the PDSCH before receiving the HARQ-ACK information corresponding to the PDSCH from the UE.

However, NR supports re-transmission for SI message within an SI window. For broadcast SI message transmission, the UE does not transmit any HARQ-ACK in response to PDSCH receptions. The network node will keep transmitting SI messages without HARQ-ACK from the UE. On the other hand, the UE needs a period of time to process the PDCCH/PDSCH. In an event that two transmissions associated with the same SI message are received consecutively, the UE would not have enough time to process two consecutive PDSCH and perform soft combining. Thus, some timing gaps between one PDSCH to another PDSCH for the same SI message need to be specified in order to account for the PDCCH/PDSCH processing latency. It is beneficial for implementation if the timelines were consistent with unicast data constraint.

In view of the above, the present disclosure proposes a number of schemes pertaining to re-transmission of SI message with respect to the UE and the network apparatus. According to the schemes of the present disclosure, methods and apparatus for handling re-transmission of SI message, and procedures to avoid UE decoding failure are provided. Some timing gaps may be defined between one PDSCH to another PDSCH. The network node should not re-transmit a PDSCH earlier than a timing gap after transmitting the PDSCH. The UE is not expected to receive and decode a re-transmission of an earlier PDSCH. The timing gap may be defined according to UE capability and/or PDSCH configurations. Accordingly, the UE can have enough time to process the re-transmission of SI message, perform soft combining, and decode the SI message successfully.

Specifically, the UE may receive a first transmission (e.g., initial transmission) from the network node. The first transmission may comprise a first PDSCH. The UE may further receive a second transmission (e.g., re-transmission) from the network node. The second transmission may comprise a second PDSCH. The UE may be configured to determine whether a timing gap between the first transmission and the second transmission is less than a predetermined processing time. In an event that the timing gap is less than the predetermined processing time, the UE may be configured to ignore the second transmission. In an event that the timing gap is greater than the predetermined processing time, the UE may be configured to decode the second transmission.

The second transmission may comprises a re-transmission/repetition of the first transmission. For example, the second PDSCH may comprise a re-transmission/repetition of the first PDSCH. The first PDSCH and the second PDSCH may comprise the same SI transport block. For example, the first PDSCH and the second PDSCH may comprise the same SI message. In other words, the second PDSCH may comprise a SI repetition. The UE may be configured to determine whether the second PDSCH comprises the SI repetition according to at least one of a DCI format 1_0 with cyclic redundancy check (CRC) scrambled by system information-radio network temporary identifier (SI-RNTI), and an SI-window. In an event that the second PDSCH corresponds to the same SI message, the UE may determine that the second PDSCH comprises the SI repetition. For example, in an event that the second PDSCH is within the same SI-window as the first PDSCH, the UE may determine that the second PDSCH comprises the SI repetition.

The UE may be configured to determine whether a starting symbol of the second PDSCH is less than a predetermined number of symbols (e.g., N symbols) after a last symbol of the first PDSCH. The UE is not expected to decode a re-transmission of an earlier PDSCH with a starting symbol less than N symbols after the last symbol of that PDSCH. The UE may be configured to ignore the second PDSCH in an event that the starting symbol of the second PDSCH is less than N symbols after the last symbol of the second PDSCH. For example, the UE may be configured to cancel the decoding of the second PDSCH. The UE may be configured not to decode or to discard the second PDSCH.

Therefore, the timing gap between the two transmissions (e.g., the first transmission and the second transmission) should be greater than the predetermined processing time. In some implementations, the predetermined processing time may comprise the PDSCH processing time. The PDSCH processing time may comprise N1 symbols (e.g., orthogonal frequency-division multiplexing (OFDM) symbols). Thus, the timing gap between the two transmissions should be greater than N1 symbols. For a transmitted SI message, the UE does not expect the same transport block to be repeated until at least N1 symbols after the last symbol of that PDSCH. The value of N1 may be a fixed value or a predetermined value. The UE may be configured to determine the predetermined processing time (e.g., N1) according to the PDSCH processing capability.

FIG. 2 illustrates an example scenario 200 under schemes in accordance with implementations of the present disclosure. Scenario 200 involves a UE and a network node, which may be a part of a wireless communication network (e.g., an LTE network, an LTE-Advanced network, an LTE-Advanced Pro network, a 5G network, an NR network, an IoT network or an NB-IoT network). Scenario 200 illustrates the PDSCH processing time (e.g., PDSCH decoding time) for one of the PDSCH processing capabilities (e.g., PDSCH processing capability 1). For PDSCH processing capability 1, two sets of PDSCH decoding time (e.g., N1) are defined for different demodulation reference signal (DMRS) configurations. Each set may comprise four PDSCH decoding time in terms of symbols corresponding to different subcarrier spacing (SCS) configurations (e.g., $\mu$). $N_{1,0}$ may be a variable value defined for different conditions. For example, one set of PDSCH decoding time may be defined as N1=13 for $\mu$=0, N1=13 for $\mu$=1, N1=20 for $\mu$=2, and N1=24 for $\mu$=3. Accordingly, the UE may be configured to determine/select the predetermined PDSCH processing time according to the PDSCH processing capability (e.g., PDSCH processing capability 1). The UE may be further configured to determine/select the predetermined number of symbols according to the subcarrier spacing configuration (e.g., $\mu$).

In some implementations, the predetermined processing time may comprise the PDSCH processing time and some additional symbols. For example, the predetermined processing time may be defined as N1+d symbols. Thus, the timing gap between the two transmissions should be greater than N1+d symbols. For a transmitted SI message, the UE does not expect the same transport block to be repeated until at least N1+d symbols after the last symbol of that PDSCH. The value of N1 may be determined as above. The value of d may be determined according to some numerologies. Both the value of N1 and d may be defined in 3rd Generation Partnership Project (3GPP) specifications or configured by the network node.

Illustrative Implementations

FIG. 3 illustrates an example communication apparatus 310 and an example network apparatus 320 in accordance with an implementation of the present disclosure. Each of communication apparatus 310 and network apparatus 320 may perform various functions to implement schemes, techniques, processes and methods described herein pertaining to re-transmission of SI message with respect to user equipment and network apparatus in wireless communications, including scenarios/schemes described above as well as process 400 described below.

Communication apparatus 310 may be a part of an electronic apparatus, which may be a UE such as a portable or mobile apparatus, a wearable apparatus, a wireless communication apparatus or a computing apparatus. For instance, communication apparatus 310 may be implemented in a smartphone, a smartwatch, a personal digital assistant, a digital camera, or a computing equipment such as a tablet computer, a laptop computer or a notebook computer. Communication apparatus 310 may also be a part of a machine type apparatus, which may be an IoT or NB-IoT apparatus such as an immobile or a stationary apparatus, a home apparatus, a wire communication apparatus or a computing apparatus. For instance, communication apparatus 310 may be implemented in a smart thermostat, a smart fridge, a smart door lock, a wireless speaker or a home control center. Alternatively, communication apparatus 310 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 310 may include at least some of those components shown in FIG. 3 such as a processor 312, for example, communication apparatus 310 may further include one or more other components not pertinent to the proposed scheme of the present disclosure (e.g., internal power supply, display device and/or user interface device), and, thus, such component(s) of communication apparatus 310 are neither shown in FIG. 3 nor described below in the interest of simplicity and brevity.

Network apparatus 320 may be a part of an electronic apparatus, which may be a network node such as a base station, a small cell, a router or a gateway. For instance, network apparatus 320 may be implemented in an eNodeB in an LTE, LTE-Advanced or LTE-Advanced Pro network or in a gNB in a 5G, NR, IoT or NB-IoT network. Alternatively, network apparatus 320 may be implemented in the form of one or more IC chips such as, for example and without limitation, one or more single-core processors, one or more multi-core processors, or one or more RISC or CISC processors. Network apparatus 320 may include at least some of those components shown in FIG. 3 such as a processor 322, for example. Network apparatus 320 may further include one or more other components not pertinent to the proposed scheme of the present disclosure (e.g., internal power supply, display device and/or user interface device), and, thus, such component(s) of network apparatus 320 are neither shown in FIG. 3 nor described below in the interest of simplicity and brevity.

In one aspect, each of processor 312 and processor 322 may be implemented in the form of one or more single-core processors, one or more multi-core processors, or one or more CISC processors. That is, even though a singular term "a processor" is used herein to refer to processor 312 and processor 322, each of processor 312 and processor 322 may include multiple processors in some implementations and a single processor in other implementations in accordance with the present disclosure. In another aspect, each of processor 312 and processor 322 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 312 and processor 322 is a special-purpose machine specifically designed, arranged and configured to perform specific tasks including power consumption reduction in a device (e.g., as represented by communication apparatus 310) and a network (e.g., as represented by network apparatus 320) in accordance with various implementations of the present disclosure.

In some implementations, communication apparatus 310 may also include a transceiver 316 coupled to processor 312 and capable of wirelessly transmitting and receiving data. In some implementations, communication apparatus 310 may further include a memory 314 coupled to processor 312 and capable of being accessed by processor 312 and storing data therein. In some implementations, network apparatus 320 may also include a transceiver 326 coupled to processor 322 and capable of wirelessly transmitting and receiving data. In some implementations, network apparatus 320 may further include a memory 324 coupled to processor 322 and capable of being accessed by processor 322 and storing data therein. Accordingly, communication apparatus 310 and network apparatus 320 may wirelessly communicate with each other via transceiver 316 and transceiver 326, respectively. To aid better understanding, the following description of the operations, functionalities and capabilities of each of communication apparatus 310 and network apparatus 320 is provided in the context of a mobile communication environment in which communication apparatus 310 is implemented in or as a communication apparatus or a UE and network apparatus 320 is implemented in or as a network node of a communication network.

In some implementations, processor 312 may receive, via transceiver 316, a first transmission (e.g., initial transmission) from the network node. The first transmission may comprise a first PDSCH. Processor 312 may further receive, via transceiver 316, a second transmission (e.g., re-transmission) from the network node. The second transmission may comprise a second PDSCH. Processor 312 may be configured to determine whether a timing gap between the first transmission and the second transmission is less than a predetermined processing time. In an event that the timing gap is less than the predetermined processing time, processor 312 may be configured to ignore the second transmission. In an event that the timing gap is greater than the predetermined processing time, processor 312 may be configured to decode the second transmission.

In some implementations, processor 312 may be configured to determine whether the second PDSCH comprises the SI repetition according to at least one of a DCI format 1_0 with CRC scrambled by SI-RNTI, and an SI-window. In an event that the second PDSCH corresponds to the same SI message, processor 312 may determine that the second PDSCH comprises the SI repetition. For example, in an event that the second PDSCH is within the same SI-window as the first PDSCH, processor 312 may determine that the second PDSCH comprises the SI repetition.

In some implementations, processor 312 may be configured to determine whether a starting symbol of the second PDSCH is less than a predetermined number of symbols (e.g., N symbols) after a last symbol of the first PDSCH. Processor 312 is not expected to decode a re-transmission of an earlier PDSCH with a starting symbol less than N symbols after the last symbol of that PDSCH. Processor 312 may be configured to ignore the second PDSCH in an event that the starting symbol of the second PDSCH is less than N symbols after the last symbol of the second PDSCH. For example, processor 312 may be configured to cancel the decoding of the second PDSCH. Processor 312 may be configured not to decode or to discard the second PDSCH.

In some implementations, the predetermined processing time may comprise the PDSCH processing time. The PDSCH processing time may comprise N1 symbols (e.g., OFDM symbols). Thus, the timing gap between the two transmissions should be greater than N1 symbols. For a transmitted SI message, processor 312 does not expect the same transport block to be repeated until at least N1 symbols after the last symbol of that PDSCH. The value of N1 may be a fixed value or a predetermined value. Processor 312 may be configured to determine the predetermined processing time (e.g., N1) according to the PDSCH processing capability.

In some implementations, processor 312 may be configured to determine/select the predetermined PDSCH processing time according to the PDSCH processing capability (e.g., PDSCH processing capability 1). Processor 312 may be further configured to determine/select the predetermined number of symbols according to the subcarrier spacing configuration (e.g., µ).

In some implementations, for a transmitted SS/PBCH block, processor 312 does not expect the same transport block to be repeated until at least N1+d symbols after the last symbol of that PDSCH. Processor 312 may determine the value of N1 according to above-mentioned schemes. Processor 312 may determine the value of d according to some numerologies. Processor 312 may determine the value of N1 and/or d according to 3GPP specifications or configurations received from network apparatus 320.

Illustrative Processes

Figure 4:
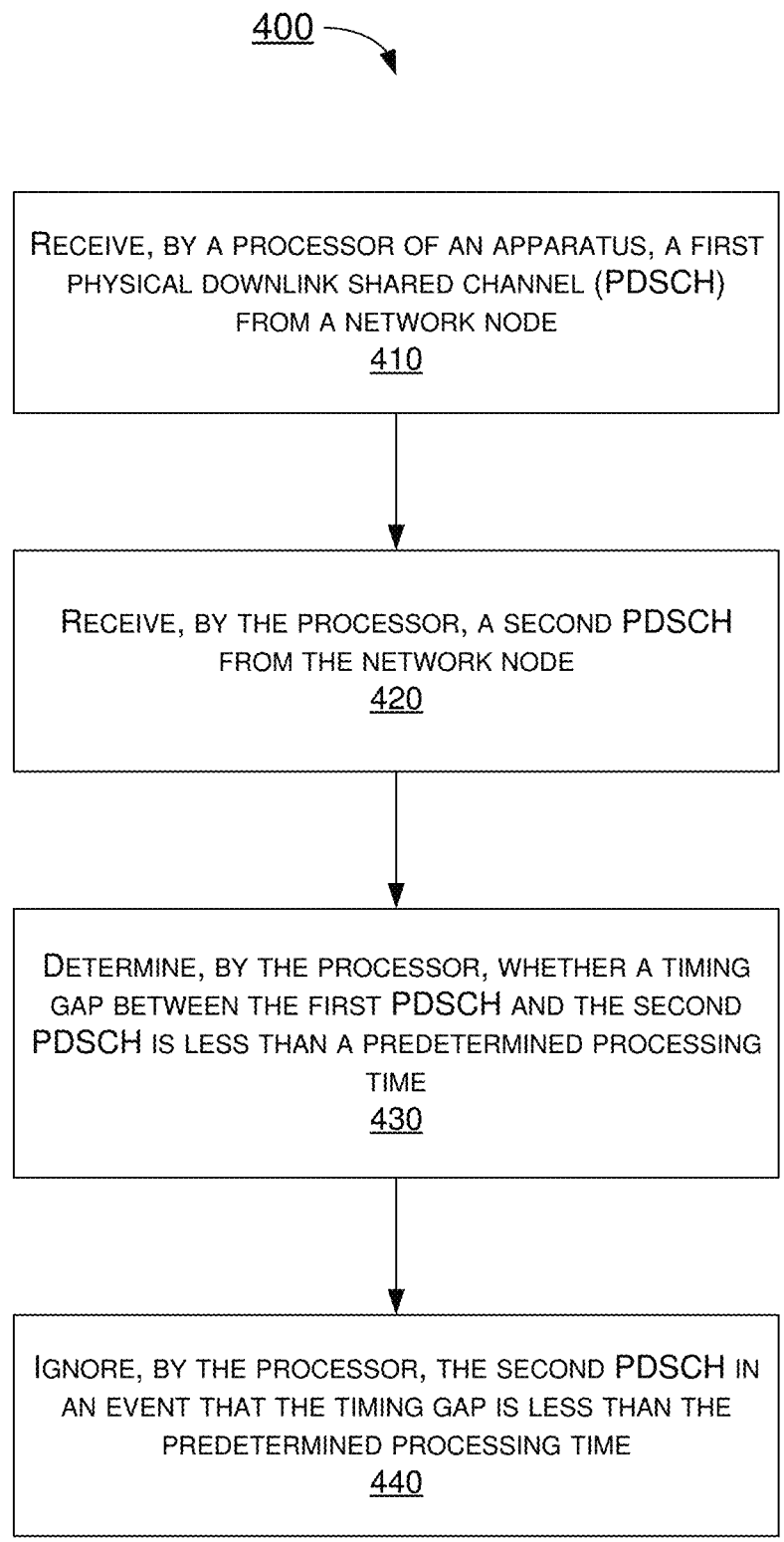
FIG. 4 is a flowchart of an example process in accordance with an implementation of the present disclosure.

FIG. 4 illustrates an example process 400 in accordance with an implementation of the present disclosure. Process 400 may be an example implementation of above scenarios/schemes, whether partially or completely, with respect to re-transmission of SI message with the present disclosure. Process 400 may represent an aspect of implementation of features of communication apparatus 310. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may executed in the order shown in FIG. 4 or, alternatively, in a different order. Process 400 may be implemented by communication apparatus 310 or any suitable UE or machine type devices. Solely for illustrative purposes and without limitation, process 400 is described below in the context of communication apparatus 310. Process 400 may begin at block 410.

At 410, process 400 may involve processor 312 of apparatus 310 receiving a first PDSCH from a network node. Process 400 may proceed from 410 to 420.

At 420, process 400 may involve processor 312 receiving a second PDSCH from the network node. Process 400 may proceed from 420 to 430.

At 430, process 400 may involve processor 312 determining whether a timing gap between the first PDSCH and the second PDSCH is less than a predetermined processing time. Process 400 may proceed from 430 to 440.

At 440, process 400 may involve processor 312 ignoring the second PDSCH in an event that the timing gap is less than the predetermined processing time.

In some implementations, the second PDSCH may comprise a re-transmission of the first PDSCH.

In some implementations, process 400 may involve processor 312 decoding the second PDSCH in an event that the timing gap is greater than the predetermined processing time.

In some implementations, process 400 may involve processor 312 cancelling decoding of the second PDSCH.

In some implementations, process 400 may involve processor 312 determining the predetermined processing time according to a PDSCH processing capability.

In some implementations, process 400 may involve processor 312 determining whether a starting symbol of the second PDSCH is less than a predetermined number of symbols after a last symbol of the first PDSCH.

In some implementations, process 400 may involve processor 312 determining the predetermined number of symbols according to a subcarrier spacing configuration.

In some implementations, the predetermined processing time may comprise a PDSCH processing time.

In some implementations, the second PDSCH may comprise an SI repetition.

In some implementations, process 400 may involve processor 312 determining whether the second PDSCH comprises the SI repetition according to at least one of a DCI format 1_0 with CRC scrambled by SI-RNTI, and an SI-window.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method for re-transmission of system information (SI) message in mobile communications, comprising:
    receiving, by a processor of an apparatus, a first physical downlink shared channel (PDSCH) from a network node;
    receiving, by the processor, a second PDSCH from the network node;
    determining, by the processor, a predetermined processing time according to a PDSCH processing capability by selecting a number of symbols corresponding to a subcarrier spacing configuration;

determining, by the processor, whether a timing gap between the first PDSCH and the second PDSCH is less than the predetermined processing time; and skipping, by the processor, decoding of the second PDSCH in an event that the timing gap is less than the predetermined processing time.

2. The method of claim 1, wherein the second PDSCH comprises a re-transmission of the first PDSCH.

3. The method of claim 1, further comprising:

decoding, by the processor, the second PDSCH in an event that the timing gap is equal to or greater than the predetermined processing time.

4. The method of claim 1, wherein the determining comprises determining whether a starting symbol of the second PDSCH is less than a predetermined number of symbols after a last symbol of the first PDSCH.

5. The method of claim 4, further comprising:

determining, by the processor, the predetermined number of symbols according to a subcarrier spacing configuration.

6. The method of claim 1, wherein the predetermined processing time comprises a PDSCH processing time.

7. The method of claim 1, wherein the second PDSCH comprises a SI repetition.

8. The method of claim 7, further comprising:

determining, by the processor, whether the second PDSCH comprises the SI repetition according to an SI-window or according to the SI-window and downlink control information (DCI) format 1_0 with cyclic redundancy check (CRC) scrambled by system information-radio network temporary identifier (SI-RNTI).

9. An apparatus for re-transmission of system information (SI) message in mobile communications, comprising:

a transceiver which, during operation, wirelessly communicates with a network node of a wireless network; and a processor communicatively coupled to the transceiver such that, during operation, the processor performs operations comprising:

receiving, via the transceiver, a first physical downlink shared channel (PDSCH) from the network node;

receiving, via the transceiver, a second PDSCH from the network node;

determining a predetermined processing time according to a PDSCH processing capability by selecting a number of symbols corresponding to a subcarrier spacing configuration;

determining whether a timing gap between the first PDSCH and the second PDSCH is less than a predetermined processing time; and skipping decoding of ignoring the second PDSCH in an event that the timing gap is less than the predetermined processing time.

10. The apparatus of claim 9, wherein the second PDSCH comprises a re-transmission of the first PDSCH.

11. The apparatus of claim 9, wherein, during operation, the processor further performs operations comprising:

decoding the second PDSCH in an event that the timing gap is equal to or greater than the predetermined processing time.

12. The apparatus of claim 9, wherein, in determining whether a timing gap between the first PDSCH and the second PDSCH is less than a predetermined processing time, the processor determines whether a starting symbol of the second PDSCH is less than a predetermined number of symbols after a last symbol of the first PDSCH.

13. The apparatus of claim 12, wherein, during operation, the processor further performs operations comprising:

determining the predetermined number of symbols according to a subcarrier spacing configuration.

14. The apparatus of claim 9, wherein the predetermined processing time comprises a PDSCH processing time.

15. The apparatus of claim 9, wherein the second PDSCH comprises a SI repetition.

16. The apparatus of claim 15, wherein, during operation, the processor further performs operations comprising:

determining whether the second PDSCH comprises the SI repetition according to an SI-window or according to the SI-window and a downlink control information (DCI) format 1_0 with cyclic redundancy check (CRC) scrambled by system information-radio network temporary identifier (SI-RNTI).

* * * * *